March 6, 1928.  
C. A. SMITH  
COWL LIGHT FOR AUTOMOBILES  
Filed June 30, 1924

1,661,975

C. A. Smith, Inventor

By C A Snow & Co
Attorneys

Patented Mar. 6, 1928.

1,661,975

UNITED STATES PATENT OFFICE.

CARL A. SMITH, OF DEFIANCE, OHIO.

COWL LIGHT FOR AUTOMOBILES.

Application filed June 30, 1924. Serial No. 723,294.

This invention relates to side lights for automobiles and more particularly to the operation of the lights. The object of the invention is to provide simple and efficient mechanism for turning the side lights of an automobile operable from the dash or instrument board of the car.

Another object of the invention is to provide a device of this character so constructed that each light may be turned independently to aid the operator of the automobile to locate objects and obstructions that are not within the range of the headlights. Another object is to provide a device of this character constructed of bars and rods arranged in connection with a set of gears so as to permit the operator to turn the side lights to any position desired, one independently of the other, and to retain them in the position desired and to return them to initial position by a slight upward movement.

Another object is to provide a device of this character operable to provide a light to the rear or either side of the car the lights being controlled from the dash of a car with little effort.

With the foregoing and other objects in view which will appear as the description proceeds, the invention resides in the combination and arrangement of parts and in the details of construction hereinafter described and claimed, it being understood that changes in the precise embodiment of the invention herein disclosed may be made without departing from the spirit of the invention.

In the accompanying drawings:—

Figure 1:
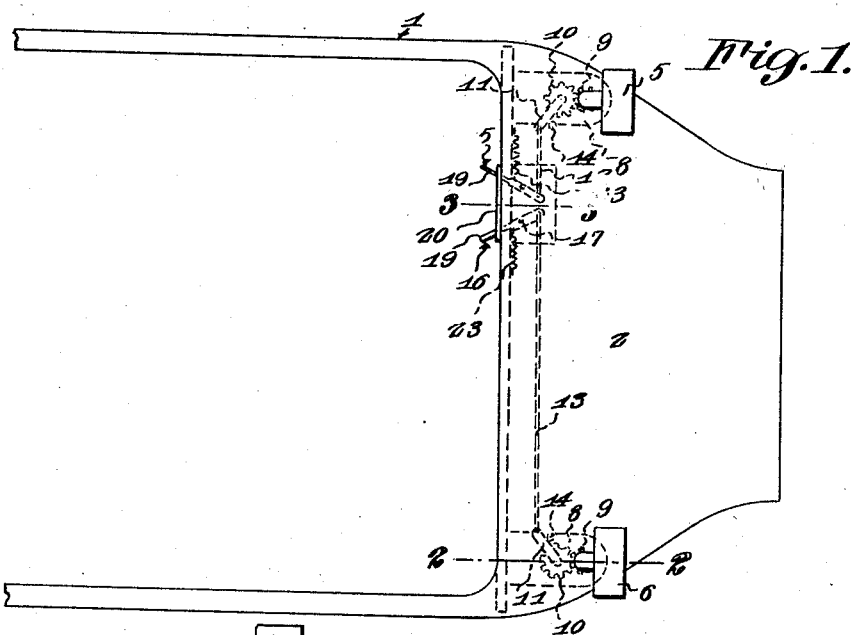
Figure 1 represents a plan view of the front portion of an automobile with these improved cowl lights shown applied.
Figure 2:
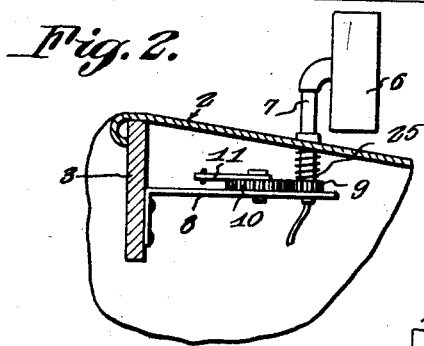
Fig. 2 is a detail transverse section taken on the line 2—2 of Fig. 1.
Figure 3:
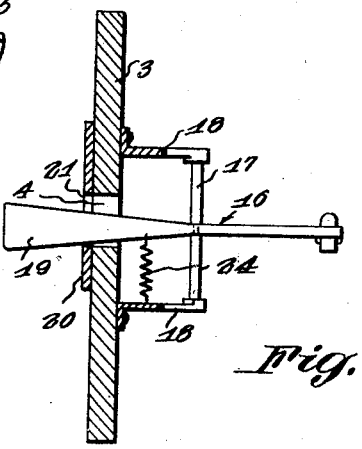
Fig. 3 is a detail vertical section showing the actuating means for one of the lamps.
Figure 4:
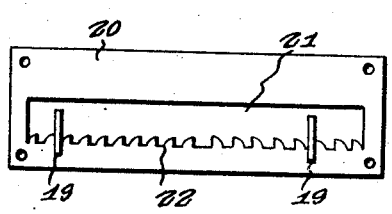
Fig. 4 is a detail front elevation of the rod for locking the actuating levers in adjusted position, the levers being shown in end elevation.

In the embodiment illustrated the front portion of an automobile 1 is shown having the usual cowl 2 on which is mounted at opposite sides of the car lights 5 and 6 the shanks 7 of which extend downwardly through the cowl 2 and through a supporting bracket 8 secured to the dash or instrument board 3. These shanks 7 have cog wheels 9 fixed thereto and mesh with large gears 10 mounted to rotate on the bracket 8. These gears 10 have arms 11 secured at one end to the journals of the gears and connected at their outer ends to rods 12 and 13, the rod 12 which actuates the gear at the left of the car being shown shorter than the rod 13 which controls the gear at the right of the car for obvious reasons.

Stop pins 14 are located in the paths of the arms 11 to limit the swinging of said arms in one direction. Actuating levers 15 and 16 are fulcrumed intermediate their ends on pins 17 mounted in suitable supporting brackets 18 being here shown for this purpose. These levers 15 and 16 are preferably constructed of flat metal bars pivoted intermediate their ends to provide flat actuating fingers 19 which extend through a longitudinally extending slot 4 in the instrument board 3 and through a registering slot 21 formed in a plate 20 secured to the inner face of board 3. The lower wall of the slot 21 is provided with ratchet teeth 22 forming a rack with which the fingers 19 are designed to be engaged for locking them in adjusted position.

Coiled springs 23 connect the levers 15 and 16 in rear of their fulcrums to a fixed portion of the car and operate to assist them in returning the lights to initial position when the levers are released from the lock bar. Other coiled springs 24 connect the levers 15 and 16 with the lower portions of the members 18 and operate to yieldably hold the actuating fingers 19 of said levers engaged with the lock bar 22.

Coiled springs 25 are mounted on the stems of shanks of the lights 5 and 6 and operate to hold the lights in position.

From the above description it will be obvious that the lights 5 and 6 may be individually operated by means of the levers 15 and 16 the actuating fingers 19 of which are conveniently positioned on the instrument board for operation by the driver. Each light is adapted to be moved in any desired position for illuminating the adjacent territory at any angle to the highway.

I claim:—

Headlights for motor vehicles including vertical shafts mounted for horizontal rotation, means for rotating the shafts, said rotating means including rods, the free ends of the rods being disposed adjacent to each other, pivoted levers connected with the rods, and movable in horizontal planes, said levers adapted to be operated simultaneously or independently to operate the rods, a plate having a slot through which the levers extend, teeth formed in the plate and against which the levers move, spring members connected with the levers and plates for holding the levers into engagement with the teeth.

In testimony that I claim the foregoing as my own, I have hereto affixed my signature.

CARL A. SMITH.